United States Patent

Sehr et al.

[11] Patent Number: 5,851,455
[45] Date of Patent: Dec. 22, 1998

[54] PROCESS AND DEVICE FOR FITTING EXTRUDATES WITH SECURING COMPONENTS OR THE LIKE

[75] Inventors: Ralf Sehr, Losheim; Stefan Kotz, Merzig, both of Germany

[73] Assignee: Saar-Gummiwerk GmbH, Wadern, Germany

[21] Appl. No.: 765,323

[22] PCT Filed: Mar. 21, 1996

[86] PCT No.: PCT/DE96/00526

§ 371 Date: Dec. 24, 1996

§ 102(e) Date: Dec. 24, 1996

[87] PCT Pub. No.: WO96/33854

PCT Pub. Date: Oct. 31, 1996

[30] Foreign Application Priority Data

Apr. 26, 1995 [DE] Germany ................ 195 15 334.0

[51] Int. Cl.[6] .................... B29C 47/02; B29C 47/92
[52] U.S. Cl. ..................... 264/40.1; 264/171.11; 264/211.21; 425/114; 425/135; 425/162
[58] Field of Search ............. 264/40.1, 171.11, 264/211.21, 171.12; 425/135, 162, 113, 114

[56] References Cited

U.S. PATENT DOCUMENTS

| 2,575,138 | 11/1951 | Slaughter | 264/171.11 |
|---|---|---|---|
| 2,599,493 | 6/1952 | Slaughter | 264/171.11 |
| 2,962,813 | 12/1960 | Kreidler . | |
| 3,826,285 | 7/1974 | Reynolds . | |
| 3,981,452 | 9/1976 | Eckstein . | |
| 5,022,940 | 6/1991 | Mehoudar | 264/40.1 |

FOREIGN PATENT DOCUMENTS

| 37 42 416 | 6/1989 | Germany . | |
|---|---|---|---|
| 52-7021 | 2/1977 | Japan | 264/171.11 |
| 58-56835 | 4/1983 | Japan . | |

*Primary Examiner*—Mathieu D. Vargot
*Attorney, Agent, or Firm*—James Creighton Wray; Meera P. Narasimhan

[57] ABSTRACT

This is a proposal of a process and a device for the serial assembly of extrudates with securing elements or the like, where the securing elements or the like are fed to the extrusion tool during the extrusion process. Then they are inserted in said extrusion tool and anchored in the extrudate as a result of the occurring extrusion.

3 Claims, 2 Drawing Sheets

PROCESS AND DEVICE FOR FITTING EXTRUDATES WITH SECURING COMPONENTS OR THE LIKE

BACKGROUND OF THE INVENTION

This invention relates to a process and device for the serial assembly of extrudates with securing elements or the like.

The following procedure was customary until now in order to equip an extrudate with securing elements: After extrusion, the extrudate was drilled or punched in a separate device in order to provide corresponding receiving possibilities for the securing element or the like. Then the securing elements that were to be attached and that were present in a loose fashion were manually (or also by machine) moved into the corresponding position on the extrudate.

The working steps involving drilling or punching as well as the subsequent manual assembly of the extrudate with the securing elements or the like (possibly also with the help of machines) are very time-consuming and cost-intensive.

Therefore, the object of the invention is to develop a process and a device that will permit time-saving and cost-effective procedures for the assembly of extrudates with securing elements or the like.

SUMMARY OF THE INVENTION

This problem is solved according to the invention in that the securing elements or the like are fed during the extrusion process to the extrusion tool. They are then inserted in the latter and anchored in the extrudate by the resulting extrusion.

Thus, expensive drilling or punching to make openings for fitting the securing elements can be eliminated, because according to the invention the securing elements or the like are already incorporated in the material during the process of producing the extrudates. It was furthermore found that the elements incorporated in the extrudate, according to the process involved in the invention, have a comparatively solid seat. Undesirable twisting or shifting of the securing elements can no longer be observed.

The securing elements can be worked into the extrudate either loosely as individual elements or in a manner connected to each other.

DETAILED DESCRIPTION OF THE PREFERRED EMBODIMENTS

Figure 1A:
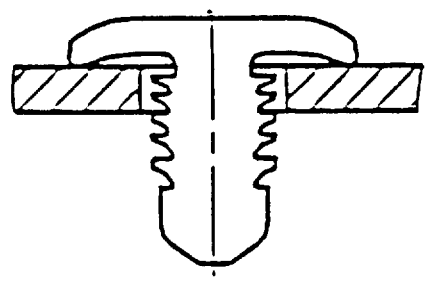
FIGS. 1a and 1b are front views of the securing elements in extrudates.
Figure 1B:
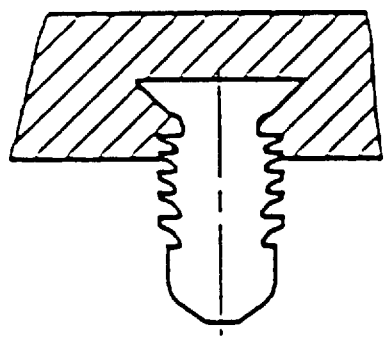

FIGS. 1a and 1b show different embodiments of the securing elements in extrudates, as discussed below.

The procedure takes place in a corresponding device (FIG. 2) in such a manner that via a conveyor and sorting system (2), the loose elements (7) to be secured are individually fed to the extrusion tool (1) or to the injection head. Prior to the exit of the elements out of this system (positioning), they remain in a set position. The flow path of extrudate (6), which is acquired by a special distance measurement system (5), makes it possible (in case of a corresponding imaging of the flow path), in response to an electrical signal, to have the latter acting as an input signal of a control unit and trigger a feeder unit (3a). The latter clocks the securing element or the like in such a manner that it is supplied out of its set position to the material stream (extrudate) whenever the corresponding interval to the predecessor has been reached. In the process, the securing element (7) or the like establishes a firm connection with the extrudate. Positioning the securing elements or the like in the extrudate during extrusion and specifically in the extrusion tool or the injection head offers the following critical advantages:

there is no drilling or punching;

there is no manual positioning of the securing elements or the like;

various positioning of securing elements or the like is possible with the help of an electrical control unit comprising a distance measurement system and setting unit;

secure connection between securing element and extrudate resulting from the fact that the securing element or the like can have extrudate injected around it or over it up to its functional range or it may be immersed;

optical improvement.

In hollow chamber extrudates, it is further possible to prevent a functional restriction in that the head of the securing element is arranged inside the extrudate wall (FIGS. 1a and 1b) and that, because of this all-around injection, one needs a comparatively small back-hooking surface on the securing element or the like, as one can see in FIGS. 1a and 1b for a selected securing element.

Figure 2:
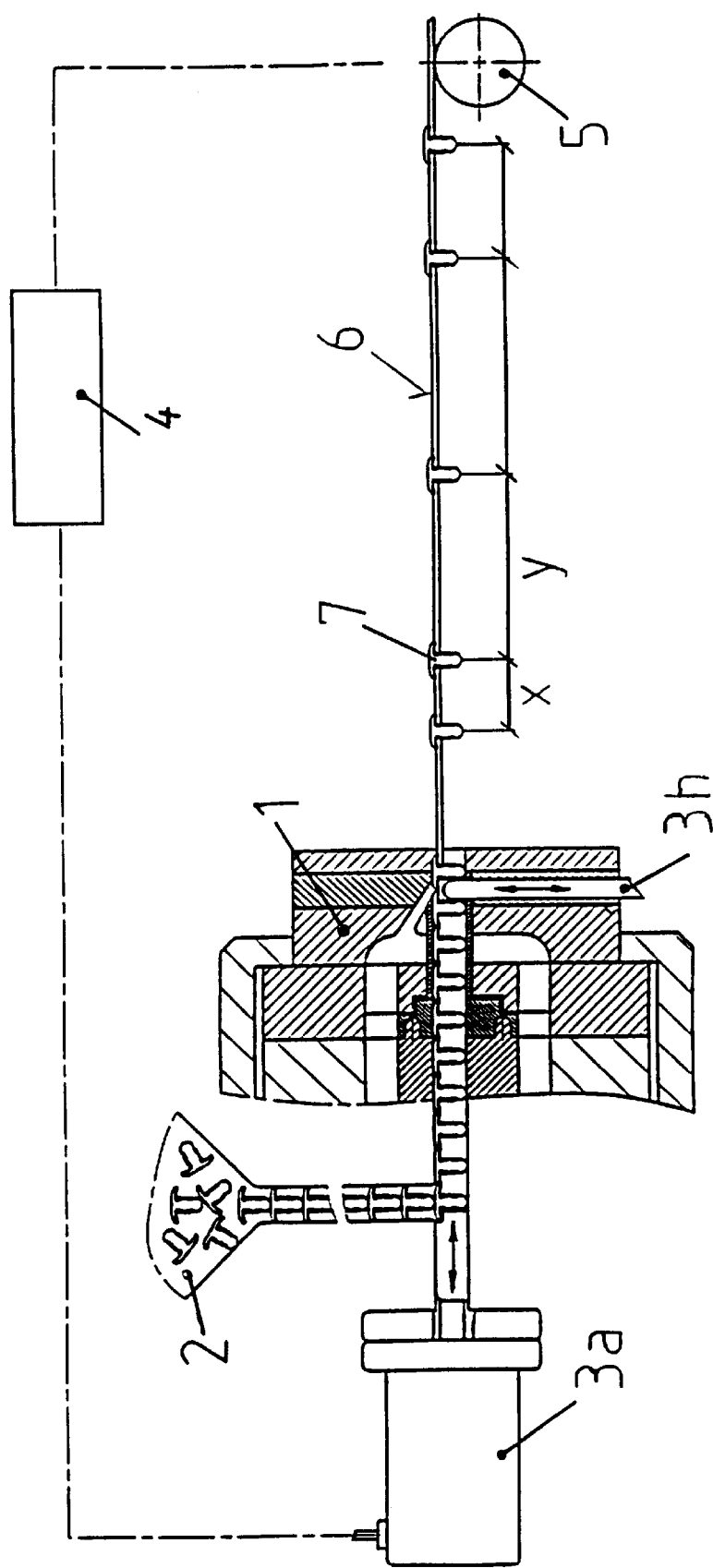
FIG. 2 is a front perspective of the system of the invention.

An exemplary embodiment will be explained in greater detail below for a device corresponding to the process according to the invention with the help of a layout sketch in FIG. 2.

In a conveyor and sorting system (2), release elements that are to be secured are stored and are already arranged in a vertical supply duct so that on entering the horizontal supply duct, they will assume the position respectively required for their awaiting position.

Clocking for entry into the extrusion tool (1) is done via a supply unit (3a) that can work electronically, pneumatically, or hydraulically. The clock signals are formed here in a control unit (4). On the one hand, they are based on a distance measurement signal picked up on the moving extrudate (6), and on the other hand, they are based on predetermined interval figures that must be stored in the control unit or be adjusted on it.

The device's structure, as well as its operating principle here, is independent of specific system components. Therefore, it is immaterial as it relates to the operating principle whether the distance measurement system (5) is a special one; whether signal transmission is analog or digital; whether the feeder unit (3a) works electronically, pneumatically, or hydraulically; or whether the control is programmable or if it can be set in some other way.

We claim:

1. A process for serial assembly of extrudates with securing elements comprising controlling a feeder unit containing the securing elements with a control unit, feeding securing elements with the feeder unit during extrusion to an extrusion tool, and inserting and anchoring the securing elements in the extrudate during the extrusion.

2. A serial assembly system for providing securing elements in extrudates at spaced intervals comprising a conveyor and a sorting system, plural loose securing elements in the sorting system, an extrusion tool having extrudate positioned proximal the sorting system, a duct for conveying the loose securing elements at an intended set position on the extrudate, a synchronously clocked setting and an extrudate feeder unit provided on the extrusion tool, a distance measurement device connected to tool for measuring and providing a length of the extrudate, and a control unit connected to the distance measurement device and the extrusion tool for triggering clock pulses in the clocked setting whereby the loose securing elements are assembled with the extrudate at the intended set position.

3. A serial assembly process comprising providing a feeder-sorter device, providing plural fastening elements in the device, providing an extrusion die proximal the device, feeding and individually positioning each of the plural fastening elements in a spray head of the extrusion die, connecting an integral-path measuring system to the die, measuring and recording extrusion speed, connecting a control unit to the path measuring system for receiving the measured extrusion speed, connecting a feed unit to the control unit, activating the feed unit in response to a signal from the control unit, supplying the positioned fastening element to an extrudate from the die, and anchoring and assembling the fastening elements in the extrudate at desired intervals.

* * * * *